United States Patent
Yuda et al.

(10) Patent No.: US 9,653,876 B2
(45) Date of Patent: May 16, 2017

(54) GAS LASER APPARATUS FOR DETERMINING COMPOSITION RATIO OF LASER GAS

(71) Applicant: FANUC CORPORATION, Minamitsuru-gun, Yamanashi (JP)

(72) Inventors: Kenichi Yuda, Yamanashi (JP); Tetsuhisa Takazane, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/007,653

(22) Filed: Jan. 27, 2016

(65) Prior Publication Data

US 2016/0226213 A1   Aug. 4, 2016

(30) Foreign Application Priority Data

Jan. 29, 2015  (JP) ................................. 2015-015609

(51) Int. Cl.
| | |
|---|---|
| H01S 3/097 | (2006.01) |
| H01S 3/00 | (2006.01) |
| H01S 3/036 | (2006.01) |
| H01S 3/134 | (2006.01) |
| H01S 3/223 | (2006.01) |

(52) U.S. Cl.
CPC ........ *H01S 3/09705* (2013.01); *H01S 3/0014* (2013.01); *H01S 3/036* (2013.01); *H01S 3/134* (2013.01); *H01S 3/2232* (2013.01)

(58) Field of Classification Search
CPC .... H01S 3/0014; H01S 3/036; H01S 3/09705; H01S 3/134; H01S 3/2232
See application file for complete search history.

(56) References Cited

U.S. PATENT DOCUMENTS

| 7,551,661 B2* | 6/2009 | Egawa .................... H01S 3/036 372/55 |
| 2008/0144681 A1* | 6/2008 | Egawa .................... H01S 3/104 372/38.04 |
| 2014/0247855 A1 | 9/2014 | Yamamoto et al. |
| 2015/0188274 A1 | 7/2015 | Wakabayashi et al. |

FOREIGN PATENT DOCUMENTS

| JP | A S61022678 | 1/1986 |
| JP | A H04080979 | 3/1992 |
| JP | 7106679 A | 4/1995 |
| JP | 2013110381 A | 6/2013 |
| JP | 2014170885 A | 9/2014 |
| WO | 2013171951 A1 | 11/2013 |
| WO | 2014003018 A1 | 1/2014 |

* cited by examiner

*Primary Examiner* — Michael Carter
(74) *Attorney, Agent, or Firm* — RatnerPrestia

(57) ABSTRACT

A gas laser apparatus includes an actual laser output acquiring unit that acquires a first actual laser output at a predetermined laser output command after passage of a predetermined time from issuing of a first laser gas pressure command and acquires a second actual laser output at the predetermined laser output command after passage of the predetermined time from issuing of a second laser gas pressure command smaller than the first laser gas pressure command and a determining unit that determines whether the composition ratio of a laser gas in a gas container is normal or not by comparing the first actual laser output with a first reference output and comparing the second actual laser output with a second reference output smaller than the first reference output.

10 Claims, 4 Drawing Sheets

GAS LASER APPARATUS FOR DETERMINING COMPOSITION RATIO OF LASER GAS

BACKGROUND OF THE INVENTION

1. Field of the Invention

The present invention relates to a gas laser apparatus, in particular to a gas laser apparatus for determining the composition ratio of a laser gas.

2. Description of the Related Art

In carbon dioxide gas laser oscillators, a laser gas circulating at high speed in a gas container is electrically discharged by a power supply for electrical discharge excitation, thereby generating laser light. A sheet metal cutting laser processing machine can cut a metal material, a resin material, or the like using laser light output from a carbon dioxide gas laser oscillator. The laser gas includes carbon dioxide gas, nitrogen gas, and helium gas as main components. The laser gas, which was produced by a gas manufacturer, has a previously designated composition ratio of carbon dioxide gas, nitrogen gas, and helium gas. Such a laser gas is supplied to the carbon gas laser oscillator through a laser gas piping system.

However, the composition ratio of actually produced laser gas is sometimes different from a designated composition ratio thereof. In addition, a laser gas having a composition ratio different from a designated one is sometimes erroneously connected to a carbon dioxide gas laser oscillator. In such a case, when the carbon dioxide gas laser oscillator is started, the oscillator stops and no laser light is output since electrical discharge impedance for the laser gas is different. As a result, the laser processing machine may not be able to cut sheet metal, a resin material, or the like.

Additionally, even when using a laser gas having an appropriate composition ratio, helium gas may leak outside from a laser gas piping system made of resin, since the helium gas included in the laser gas has small molecular weight. Additionally, even with the use of a laser gas piping system made of metal, when a pin hole is formed in the laser gas piping system, helium gas leaks from the pin hole. In such cases, the partial pressure of a helium gas component is reduced, which changes the composition ratio of the laser gas.

When the sheet metal cutting laser processing machine is relatively large, the distance from a laser gas source to the carbon dioxide gas laser oscillator may reach several tens of meters. Even in this case, due to the reason described above, the helium gas in the laser gas leaks, thereby reducing the partial pressure of the helium gas component. Furthermore, when helium gas leakage occurs in a state where laser gas remains in the laser gas piping system of a stopped carbon dioxide gas laser oscillator, the partial pressure of the helium gas component is similarly reduced.

As described above, when the laser gas in which the partial pressure of the helium gas component has been reduced is supplied to the carbon dioxide gas laser oscillator, an abnormality in the components of the laser gas is detected, as a result of which the oscillator itself is stopped. Alternatively, the power supply for electrical discharge excitation in the carbon dioxide gas laser oscillator detects the abnormality and stops, whereby no laser light is output.

A countermeasure for solving the problem described as above is to release the laser gas that contains the helium gas whose partial pressure has been reduced and that remains in the laser gas piping system, and also to supply a new laser gas to the carbon dioxide gas laser oscillator from the laser gas source.

Japanese Laid-open Patent Publication No. H4-80979 discloses a gas laser oscillator apparatus in which when helium gas leaks through a pin hole formed in a laser gas piping system, a predetermined amount of a laser gas in the laser gas piping system is released outside. Thereby, the composition ratio of the laser gas becomes normal, and therefore the carbon dioxide gas laser oscillator can be stably started.

In addition, Japanese Laid-open Patent Publication No. S61-22678 discloses a gas laser apparatus in which when electrical discharge starting voltage is high, the laser gas pressure of an electrically discharging unit in the oscillator is controlled so as to lower the electrical discharge starting voltage and changed to a laser gas pressure having favorable oscillation efficiency after starting electrical discharge.

SUMMARY OF INVENTION

However, in Japanese Laid-open Patent Publication No. H4-80979, the predetermined amount of the laser gas is released outside without confirming the state of the laser gas. Due to this, even when no pin hole or the like is formed in the laser gas piping system, the laser gas will be released, which consequently increases the consumption of the laser gas. Additionally, when laser output is reduced due to helium gas leakage from the laser gas piping system or the carbon dioxide gas laser oscillator, it requires a long time to restore the reduction of the laser output.

Furthermore, in Japanese Laid-open Patent Publication No. S61-22678, even when the composition ratio of the laser gas changes, the laser gas pressure is controlled so as to be smaller than a rated gas pressure, thereby allowing the laser gas to be electrically discharged. However, due to the changed composition ratio of the laser gas, originally desired oscillation efficiency cannot be obtained.

Additionally, in carbon dioxide gas laser oscillators, even when the composition ratio of a laser gas changes and thereby laser output is reduced, the cause of the reduction in the laser output is sometimes erroneously determined to be a long-term stop of the carbon dioxide gas laser oscillator or entry of moisture or the like in a vacuum system. In such cases, since the carbon dioxide gas laser oscillator is started after performing an aging operation for long hours, it requires a long time to start.

The present invention has been accomplished in view of the circumstances as described above. It is an object of the invention to provide a gas laser apparatus that can easily determine whether the composition ratio of a laser gas is abnormal or not without stopping a gas laser oscillator.

In order to achieve the object described above, according to a first aspect of the invention, there is provided a carbon dioxide gas laser apparatus that includes a carbon dioxide gas laser oscillator including a gas container that contains a laser gas as a laser oscillating medium and a pressure acquiring unit that acquires a pressure value of the laser gas in the gas container; a laser gas source of the laser gas to be contained in the gas container; a laser gas supplying unit that supplies the laser gas of the laser gas source to the gas container; a laser gas releasing unit that releases the laser gas from the gas container; a laser gas pressure controlling unit that controls the laser gas supplying unit and the laser gas releasing unit on a basis of the pressure value acquired by the pressure acquiring unit; a laser gas pressure command outputting unit that, when the gas laser oscillator is started, outputs a first laser gas pressure command which generates a rated laser output and a second laser gas pressure command smaller than the first laser gas pressure command; an actual laser output acquiring unit that acquires a first actual laser output at a predetermined laser output command after passage of a predetermined time from issuing of the first laser gas pressure command and acquires a second actual laser output at the predetermined laser output command after passage of the predetermined time from issuing of the second laser gas pressure command; and a determining unit that determines whether a composition ratio of the laser gas in the gas container is normal or not by comparing the first actual laser output with a first reference output and comparing the second actual laser output with a second reference output smaller than the first reference output.

According to a second aspect of the invention, in the first aspect thereof, when the first actual laser output is equal to or more than the first reference output, the determining unit determines that the composition ratio of the laser gas is normal.

According to a third aspect of the invention, in the first or second aspect thereof, when the first actual laser output is smaller than the first reference output and the second actual laser output is equal to or more than the second reference output, the determining unit determines that the composition ratio of the laser gas is abnormal.

According to a fourth aspect of the invention, in the third aspect thereof, when the determining unit determines that the composition ratio of the laser gas is abnormal, the gas laser oscillator is restarted after the laser gas releasing unit and the laser gas supplying unit perform replacement of the laser gas in the gas container.

According to a fifth aspect of the invention, in the fourth aspect thereof, when, after restarting of the gas laser oscillator, the determining unit determines that the composition ratio of the laser gas is abnormal, the gas laser oscillator is restarted again after performing an aging operation that is a predetermined-time operation by a specific laser output command.

According to a sixth aspect of the invention, in the fourth aspect thereof, when, after restarting of the gas laser oscillator, the determining unit determines that the composition ratio of the laser gas is abnormal, the gas laser oscillator is restarted again after performing an aging operation and the replacement of the laser gas in the gas container by the laser gas releasing unit and the laser gas supplying unit at least one time.

According to a seventh aspect of the invention, in the first aspect thereof, when the first actual laser output is smaller than the first reference output and the second actual laser output is smaller than the second reference output, the determining unit determines that an output of the gas laser oscillator is low.

According to an eighth aspect of the invention, in the seventh aspect thereof, when the determining unit determines that the output of the gas laser oscillator is low, the gas laser oscillator is restarted after performing an aging operation.

According to a ninth aspect of the invention, in the seventh aspect thereof, when the determining unit determines that the output of the gas laser oscillator is low, the gas laser oscillator is restarted after performing an aging operation and replacement of the laser gas in the gas container by the laser gas releasing unit and the laser gas supplying unit at least one time.

According to a tenth aspect of the invention, the gas laser oscillator apparatus of the ninth aspect thereof further includes a warning outputting unit that outputs a warning when, after restarting of the gas laser oscillator, the determining unit determines that the output of the gas laser oscillator is low.

The foregoing and other objects, features, and advantages of the invention will be more fully understood from a detailed description of typical embodiments of the invention depicted in the accompanying drawings.

DETAILED DESCRIPTION

Hereinafter, exemplary embodiments of the present invention will be described with reference to the accompanying drawings. In the following drawings, the same members are denoted by the same reference signs. For easier understanding, scales of the drawings are changed as appropriate.

Figure 1:
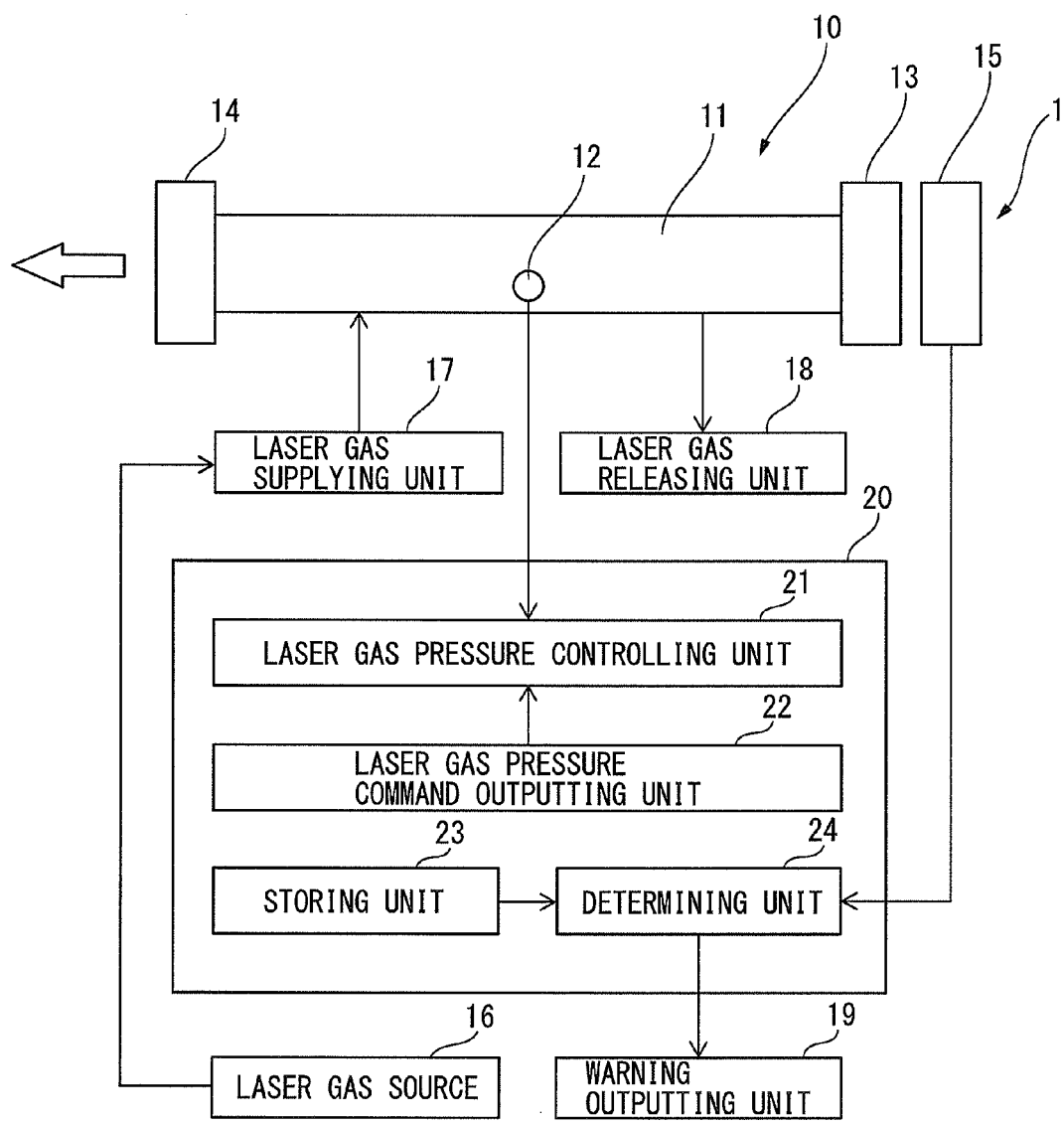
FIG. 1 is a schematic diagram of a gas laser apparatus according to an embodiment of the present invention.

FIG. 1 is a schematic diagram of a carbon dioxide gas laser apparatus according to an embodiment of the present invention. A gas laser apparatus 1 denoted in FIG. 1 mainly includes a carbon dioxide gas laser oscillator 10 and a controlling unit 20 controlling the carbon dioxide gas laser oscillator 10. In addition, the carbon dioxide gas laser oscillator 10 is assumed to be connected to be a laser processing machine, although it is not depicted in FIG. 1.

As depicted in FIG. 1, the carbon dioxide gas laser oscillator 10 includes a gas container 11 containing a laser gas as a laser oscillating medium, for example, a discharge tube. A pressure acquiring unit 12 acquiring a pressure value of the laser gas in the gas container 11, for example, a pressure sensor is located in the gas container 11.

As depicted in FIG. 1, the gas container 11 is connected to a laser gas supplying unit 17 and a laser gas releasing unit 18. The laser gas supplying unit 17 is connected to a laser gas source 16 to supply a laser gas in the laser gas source 16 to the gas container 11. The laser gas releasing unit 18 releases the laser gas in the gas container 11 to outside the apparatus.

In addition, a rear mirror 13 that hardly has partial transparency is disposed at one end of the gas container 11, and an output mirror 14 that has partial transparency is disposed at the other end thereof. The output mirror 14 and the rear mirror 13 together form a resonator and the laser gas in the gas container 11 is excited by electrical discharge, thereby oscillating laser light from the output mirror 14. Additionally, a laser power sensor 15 is located behind the rear mirror 13 to detect an actual laser output.

The carbon dioxide gas laser apparatus 10 includes the controlling unit 20 that is a digital computer. The controlling unit 20 includes a laser gas pressure controlling unit 21 controlling the laser gas supplying unit 17 and the laser gas releasing unit 18 on the basis of a pressure value acquired by the pressure acquiring unit 12. The laser gas pressure controlling unit 21 allows pressure in the gas container 11 to be maintained at a desired value.

Furthermore, the controlling unit 20 includes a laser gas pressure command outputting unit 22 outputting a first laser gas pressure command that generates a rated laser output and a second laser gas pressure command smaller than the first laser gas pressure command when the carbon dioxide gas laser oscillator 10 is started. The above-described laser power sensor 15 acquires a first actual laser output at a predetermined laser output command after passage of a predetermined time from issuing of the first laser gas pressure command and a second actual laser output at the predetermined laser output command after passage of the same predetermined time from issuing of the second laser gas pressure command.

The controlling unit 20 further includes a storing unit 23 storing various data and a determining unit 24 determining whether the composition ratio of the laser gas in the gas container 11 is normal or not by comparing the first actual laser output with a first reference output and comparing the second actual laser output with a second reference output. In addition, a warning outputting unit 19 outputting a warning in a predetermined case is connected to the controlling unit 20.

When the carbon dioxide gas laser oscillator 10 is started, a laser gas in the gas container 11 is released once by the laser gas releasing unit 18. Then, the laser gas pressure controlling unit 21 controls the laser gas supplying unit 17 and the laser gas releasing unit 18 to maintain a laser gas pressure in the gas container 11 at a pressure suitable for electrical discharge. The laser gas in the gas container 11 is excited by electrical discharge, whereby laser light is oscillated from the output mirror 14. The laser light is sent to the laser processing machine that is not illustrated, thereby processing a workpiece that is not illustrated.

When stopping the carbon dioxide gas laser oscillator 10, laser gas is filled in the gas container 11 by the laser gas supplying unit 17 to make the pressure in the gas container 11 equal to atmospheric pressure. Thereby, entry of impurities in the gas container 11 from outside can be prevented.

Figure 2:
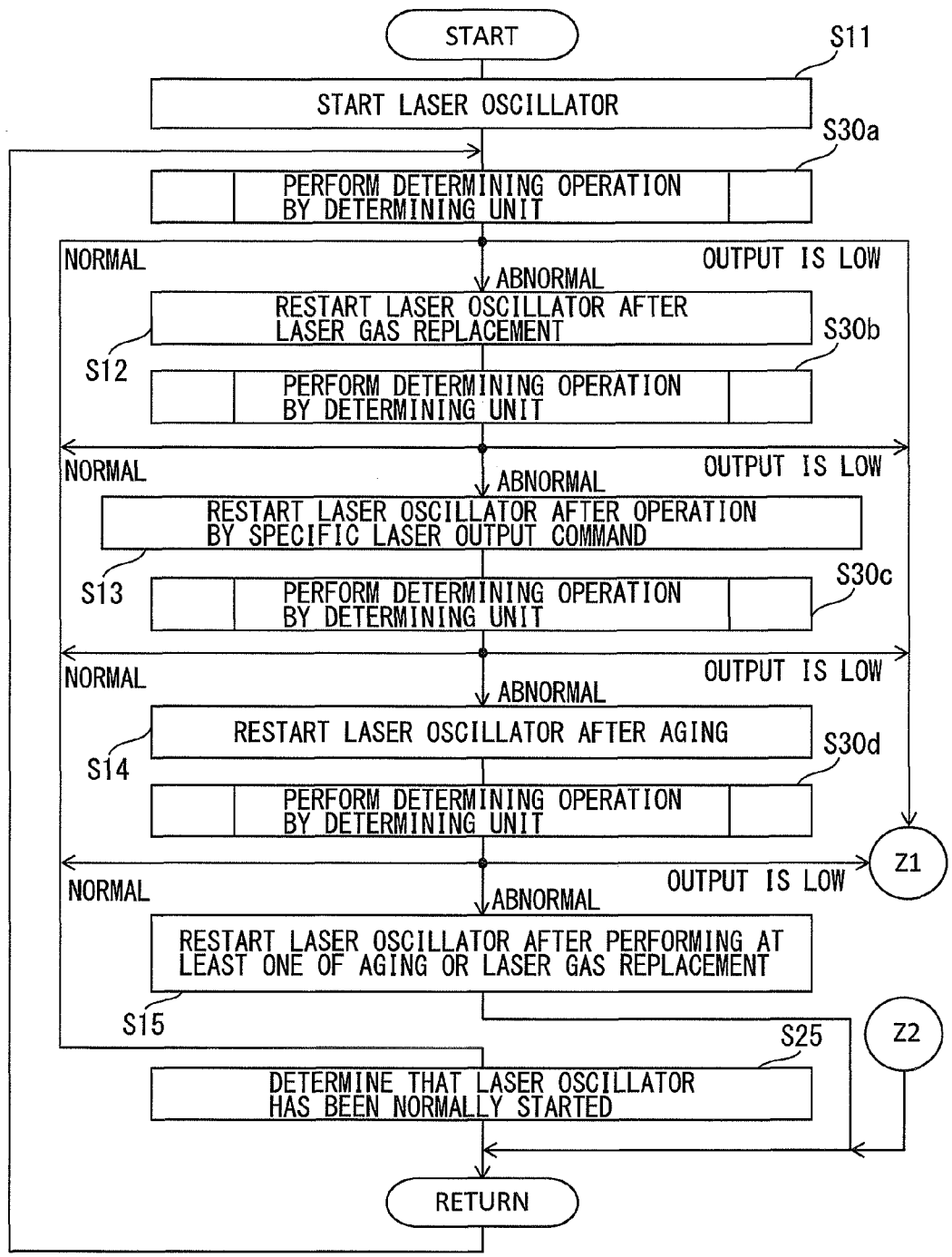
FIG. 2 is a first flowchart depicting operation of the gas laser apparatus.
Figure 3:
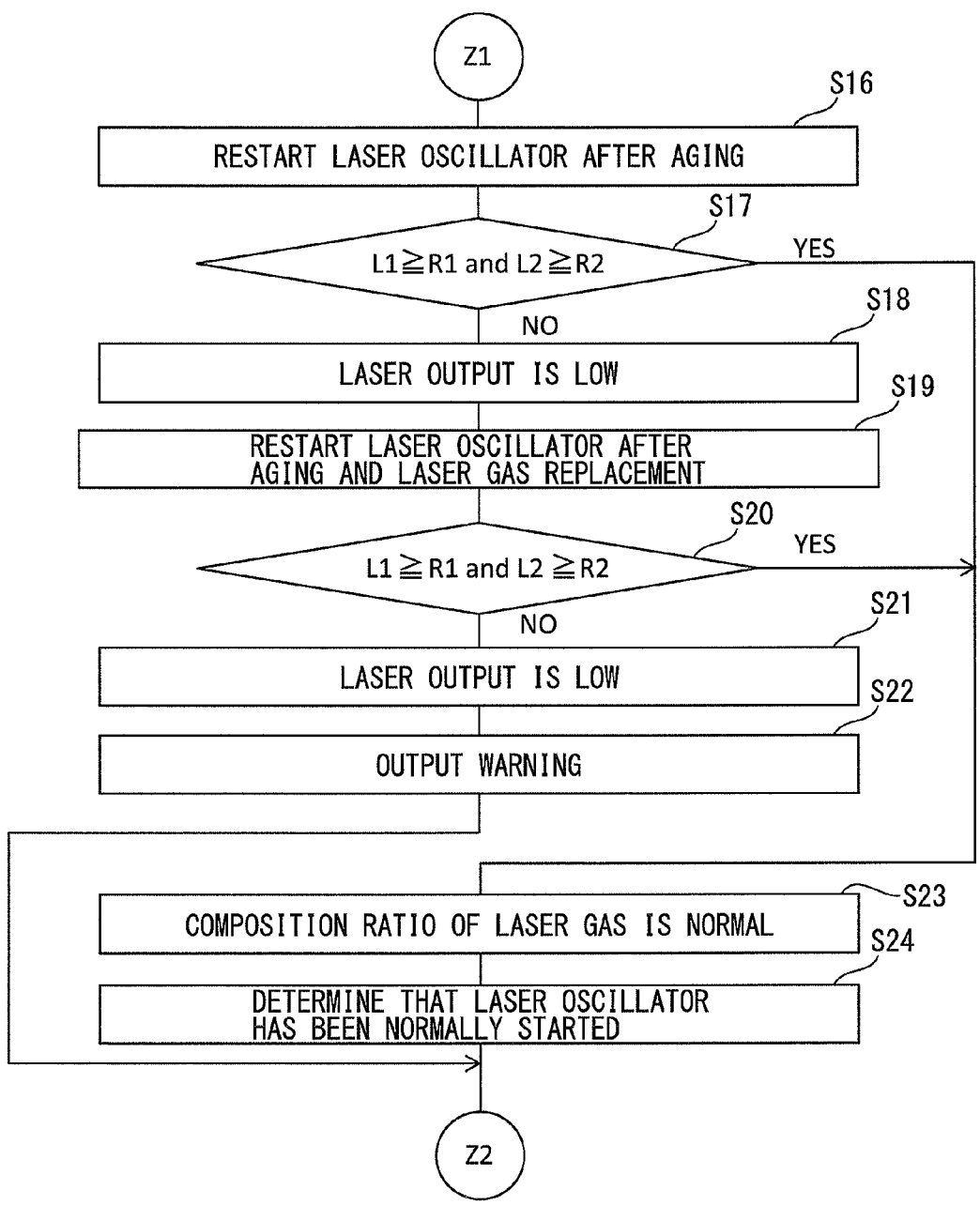
FIG. 3 is a second flowchart depicting the operation of the gas laser apparatus.

FIGS. 2 and 3 are flowcharts depicting operation of the carbon dioxide gas laser apparatus 1. Hereinafter, the operation of the carbon dioxide gas laser apparatus 1 according to the present exemplary embodiment of the invention will be described with reference to the drawings. The process depicted in the drawings is assumed to be repeatedly performed every predetermined control cycle.

Figure 4:
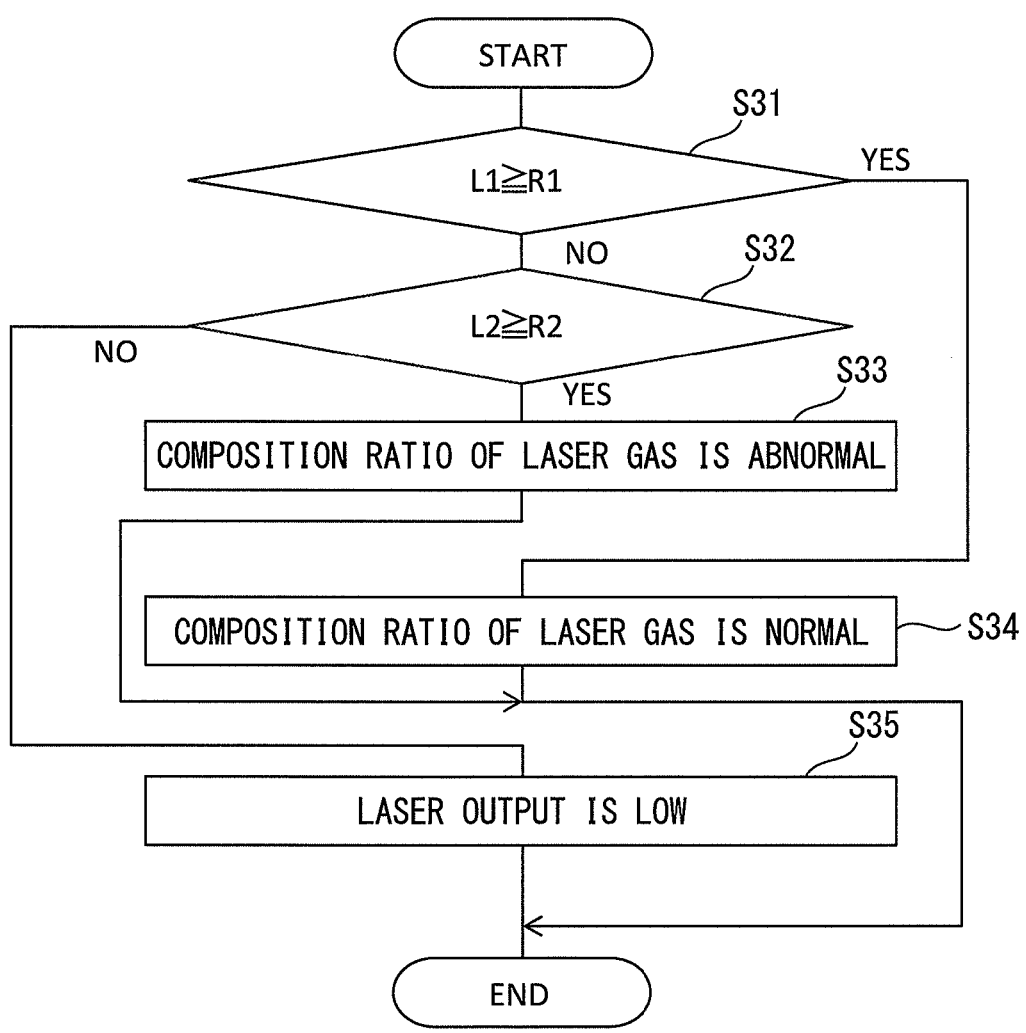
FIG. 4 is a diagram depicting a determining operation by a determining unit.

First, at a step S11 of FIG. 2, the carbon dioxide gas laser oscillator 10 is started. Then, the process goes to a step S30a, where the determining unit 24 executes a predetermined determining operation. FIG. 4 is a diagram depicting the determining operation by the determining unit 24. The content of FIG. 4 is assumed to be the same as that of steps S30a, S30b, S30c, and S30d depicted in FIG. 2. As depicted in FIG. 4, at the step S31, a first actual laser output L1 is acquired.

Specifically, the laser gas pressure command outputting unit 22 outputs a first laser gas pressure command generating a rated laser output. The laser gas pressure controlling unit 21 controls the pressure in the gas container 11 to a first laser gas pressure according to the first laser gas pressure command. Then, the laser gas pressure command outputting unit 22 outputs a predetermined output command, for example, an output command reduced by 20% from the rated laser output for a predetermined time, for example, for 30 seconds. After passage of the predetermined time, an actual laser output detected by the laser power sensor 15 is acquired as a first actual laser output L1 and stored in the storing unit 23. Then, the determining unit 24 compares the first actual laser output L1 with a first reference output R1 reduced by 30% from the rated laser output.

Then, when the first actual laser output L1 is equal to or more than the first reference output R1 at the step S31, the composition ratio of the laser gas in the gas container 11 is determined to be normal (step S34). In this case, it is unnecessary to acquire a second actual laser output L2 to be described later, and oscillation can be performed in a state where the inside of the gas container 11 is controlled to be at the first laser gas pressure. Accordingly, it can be prevented that the laser gas is unnecessarily consumed in order to acquire the second actual laser output L2 to be described later.

On the contrary, when the first actual laser output L1 is not equal to or more than the first reference output R1, the process goes to a step S32. At the step S32, the second laser actual output L2 is acquired.

Specifically, the laser gas pressure command outputting unit 22 outputs a second laser gas pressure command reduced by 20% from the first laser gas pressure command described above. The laser gas pressure controlling unit 21 controls the pressure in the gas container 11 to a second laser gas pressure according to the second laser gas pressure command. Then, the laser gas pressure command outputting unit 22 outputs the same predetermined output command as that in the step S31, for example, the output command reduced by 20% from the rated laser output for a predetermined time, for example, for 30 seconds. After passage of the predetermined time, an actual laser output detected by the laser power sensor 15 is acquired as the second actual laser output L2 and stored in the storing unit 23. Then, the determining unit 24 compares the second actual laser output L2 with a second reference output R2 reduced by 30% from the rated laser output.

Depending on the type of the carbon dioxide gas laser oscillator 10, the first reference output R1 may be larger than the second reference output R2. Additionally, the predetermined output command may be a value other than the output command reduced by 20% from the rated laser output.

Then, when the second actual laser output L2 is equal to or more than the second reference output R2 at the step S32, i.e., when the first actual laser output L1 is less than the first reference output R1 and the second actual laser output L2 is equal to or more than the second reference output R2, the composition ratio of the laser gas in the gas container 11 is determined to be abnormal (step S33). In this case, the partial pressure ratio of the helium gas component in the laser gas is reduced, thereby reducing the laser gas pressure.

In general, a gas laser oscillator performs laser oscillation by controlling to a laser gas pressure achieving the highest oscillation efficiency with respect to a specified laser gas composition. In the present exemplary embodiment, the highest oscillation efficiency is achieved at the first laser gas pressure at which the rated output is generated. Reduction in the partial pressure ratio of the helium gas in the laser gas reduces the oscillation efficiency at the first laser gas pressure. However, on the contrary, the oscillation efficiency at the second laser gas pressure smaller than the first laser gas pressure improves. Accordingly, when the first actual laser output L1 is less than the first reference output R1 and the second actual laser output L2 is equal to or more than the second reference output R2, the composition ratio of the laser gas in the gas container 11 can be determined to be abnormal.

Furthermore, when the second actual laser output L2 is not equal to or more than the second reference output R2 at the step S32, i.e., when the first actual laser output L1 is less than the first reference output R1 and the second actual laser output L2 is less than the second reference output R2, the laser output is determined to be low (step S35).

In general, installation and movement of a gas laser oscillator require stopping the gas laser oscillator for a long period of time or separating the gas laser oscillator from existing equipment. After that, when starting the gas laser oscillator, an impurity such as air or moisture sometimes enters a vacuum container of the gas laser oscillator, for example, the gas container 11, and besides, a laser gas piping system. In such a case, as a result, laser output is reduced when the gas laser oscillator is started, as described above.

Thus, the determining unit 24 of the controlling unit 20 in the present exemplary embodiment is assumed to perform three kinds of determinations: whether the composition ratio of laser gas is normal or abnormal, or that the laser output is low (steps S33 to S35). Reduction in the laser output can also be considered to be a kind of abnormality.

Referring again to FIG. 2, when the composition ratio of the laser gas is determined to be normal at the step S30a, the process goes to a step S25, where the carbon dioxide gas laser oscillator 10 is determined to have been normally started.

In addition, when the composition ratio of the laser gas is determined to be abnormal at the step S30a, the process goes to a step S12. In this case, it is highly probable that the partial pressure ratio of the helium gas in the laser gas is low. The cause is due to the leakage of the helium gas from the laser gas piping system.

Due to the reason, at the step S12, replacement of the laser gas in the gas container 11 is performed by the laser gas releasing unit 18 and the laser gas supplying unit 17. Thereby, the entire laser gas in the gas container 11 is replaced by a laser gas that has newly been supplied from the laser gas source 16 through the laser gas supplying unit 17. Then, restarting the carbon dioxide gas laser oscillator 10 in such a state allows a determination that normal laser output is obtainable.

At the step S12, the laser gas remaining in the vacuum gas container 11 of the carbon dioxide gas laser oscillator 10 and the inside of the laser gas supplying unit 17 is automatically replaced. Thus, an operator can restart the carbon dioxide gas laser oscillator 10 in a short time without doing complicated work and does not need to stop the carbon dioxide gas laser oscillator 10.

Then, the process goes to the step S30b, where the same determining operation as that described with reference to FIG. 4 is performed. When the composition ratio of the laser gas is determined to be normal at the step S30b, the process goes to the step S25, where it is determined that the carbon dioxide gas laser oscillator 10 has been normally started.

Then, when the composition ratio of the laser gas is determined to be abnormal at the step S30b, the process goes to a step S13. In this case, the degree of abnormality in the composition ratio of the laser gas can be extremely large. At the step S13, the carbon dioxide gas laser oscillator 10 is operated for only a predetermined time by a specific laser output command. In other words, the carbon dioxide gas laser oscillator 10 is subjected to an aging operation to clean the inside of the laser gas piping system. Then, restarting the carbon dioxide gas laser oscillator 10 in such a state allows a determination that normal laser output is obtainable.

In this case, only by performing the aging operation of the carbon dioxide gas laser oscillator 10, the laser oscillator 10 can be automatically restarted again in a short time, thus allowing improvement in operation rates of the carbon dioxide gas laser oscillator 10 and the laser processing machine.

Then, the process goes to the step S30c, where the determining operation described above is performed. When the composition ratio of the laser gas is determined to be normal at the step S30c, the process goes to the step S25, where the carbon dioxide gas laser oscillator 10 is determined to have been normally started.

Then, when the composition ration of the laser gas is determined to be abnormal at the step S30c, the process goes to a step S14. In this case, it is highly probable that due to any another reason than the leakage of the helium gas from the laser gas piping system, the composition ratio of the helium gas has been reduced. The reason is that air, moisture, and the like enter the laser gas supplying unit 17 due to, for example, opening of the vacuum gas container 11 to the air or replacement of the laser gas source 16, for example, a gas cylinder in maintenance work.

Accordingly, at the step S14, after replacing again the laser gas of the gas container 11, electrical discharge is performed for a predetermined time at a specified laser gas pressure by a specified laser output command (aging). Then, restarting the carbon dioxide gas laser oscillator 10 in such a state allows a determination that normal laser output is obtainable. In the present exemplary embodiment of the invention, the carbon dioxide gas laser oscillator 10 is automatically restarted after performing aging operation, thereby allowing the carbon dioxide gas laser oscillator 10 to be rapidly started.

Then, the process goes to the step S30d, where the determining operation described above is performed. When the composition ratio of the laser gas is determined to be normal at the step S30d, the process goes to the step S25, where it is determined that the carbon dioxide gas laser oscillator 10 has been normally started.

Then, when the composition ratio of the laser gas is determined to be abnormal at the step S30d, the process goes to a step S15. In this case, the degree of abnormality in the composition ratio of the laser gas can be extremely large, and additionally, the carbon dioxide gas laser oscillator 10 may have been stopped for a long time. Then, the partial pressure ratio of the helium gas is more likely to have been reduced due to any other reason than the leakage of the helium gas from the laser gas piping system and the entry of air or moisture into the laser gas supplying unit 17 caused by opening of the vacuum gas container 11 to the air and replacement of the laser gas source 16, for example, a gas cylinder in maintenance work. The reason, for example, is that the helium gas has leaked from a sealed portion of the vacuum gas container 11 and the laser gas piping system during a long-term stop of the laser oscillator.

Accordingly, at the step S15, aging operation of the carbon dioxide gas laser oscillator 10 and laser gas replacement are performed at least one time. Then, restarting the carbon dioxide gas laser oscillator 10 in such a state allows a determination that normal laser output is obtainable. In the present exemplary embodiment of the invention, even in such a case, the carbon dioxide gas laser oscillator 10 can be automatically restarted again in a short time, thus allowing improvement in the operation rates of the carbon dioxide gas laser oscillator and the laser processing machine. After that, the process goes back to the step S30a and is assumed to be repeated until normal starting of the carbon dioxide gas laser oscillator 10 is determined.

When the first actual laser output L1 is less than the first reference output R1 and the second actual laser output L2 is less than the second reference output R2, the determining unit 24 determines at the step S30a that it is an abnormal state in which the laser output of the carbon dioxide gas laser oscillator 10 is low.

Generally, installation and movement of the carbon dioxide gas laser oscillator 10 require stopping the carbon dioxide gas laser oscillator 10 for a long period or separating the carbon dioxide gas laser oscillator 10 from existing equipment. After that, when starting the gas laser oscillator, impurities such as air or moisture may enter the vacuum container of the carbon dioxide gas laser oscillator 10, for example, the gas container 11, and in addition, the laser gas piping system. In such a case, the carbon dioxide gas laser oscillator is in a state of lack of aging operation, as a result of which laser output is reduced when the carbon dioxide gas laser oscillator is started, as described above. Thus, in the present exemplary embodiment of the invention, reduction in the laser output can be rapidly detected without confirming laser output characteristics.

In this case, the process goes to a step S16 of FIG. 3, where the carbon dioxide gas laser oscillator 10 is restarted after performing an aging operation under the above-mentioned specified conditions. This can clean the vacuum gas container 11 of the carbon dioxide gas laser oscillator 10 and the insides of the laser gas supplying unit 17 and the related laser gas piping system. Thus, it can be determined that normal laser output is obtained.

Then, at a step S17, it is determined whether or not the first actual laser output L1 is equal to or more than the first reference output R1 and the second actual laser output L2 is equal to or more than the second reference output R2. This determination is substantially the same as the determining operation depicted in FIG. 2, and thus may be performed by the determining unit 24.

In addition, when the first actual laser output L1 is not equal to or more than the first reference output R1 and the second actual laser output L2 is not equal to or more than the second reference output R2, it is determined at a step S18 that the laser output of the carbon dioxide gas laser oscillator 10 is low.

In such a case, it can be determined that an impurity such as air or moisture has entered the vacuum container of the carbon dioxide gas laser oscillator 10, for example, the gas container 11, and besides, the laser gas piping system, as described above. Accordingly, the process goes to a step S19, where an aging operation is performed under specified conditions, and additionally, replacement of the laser gas in the gas container 11 is performed again, which is then followed by restarting of the carbon dioxide gas laser oscillator 10. Thereby, maximum performance of the carbon dioxide gas laser oscillator 10 can be exerted even immediately after installation or movement of the carbon dioxide gas laser oscillator 10.

Additionally, at a step S20, it is determined whether or not the first actual laser output L1 is equal to or more than the first reference output R1 and the second actual laser output L2 is equal to or more than the second reference output R2. Then, when the first actual laser output L1 is not equal to or more than the first reference output R1 and the second actual laser output L2 is not equal to or more than the second reference output R2, the laser output of the carbon dioxide gas laser oscillator 10 is determined to be low, at a step S21.

In such a case, it can be determined that there is a cause other than reduction in the partial pressure ratio of the helium gas in the laser gas. Examples of the cause include no input of a specified parameter, deterioration or contamination of the optical system of the carbon dioxide gas laser oscillator 10, such as the rear mirror 13 and the output mirror 14, poor optical axis adjustment, breakage of the laser power sensor 15, breakage of the pressure acquiring unit 12, and the presence of abnormality in temperature setting for a coolant (not illustrated) cooling the gas container 11. Then, when there is any of the causes, starting of the carbon dioxide gas laser oscillator 10 can lead to breakdown of the carbon dioxide gas laser oscillator 10.

Thus, in such a case, the process goes to a step S22, where the warning outputting unit 19 outputs a warning to the operator. Thereby, the operator is required to perform maintenance on the carbon dioxide gas laser oscillator 10. This can prevent the carbon dioxide gas laser oscillator from being broken due to repeated starting thereof, so that restoration can be accelerated.

When the first actual laser output L1 is equal to or more than the first reference output R1 and the second actual laser output L2 is equal to or more than the second reference output R2 at the steps S17 and S20, the process goes to a step S23. At the step S23, the composition ratio of the laser gas in the gas container 11 is determined to be normal. Then, at a step S24, the carbon dioxide gas laser oscillator 10 is determined to have been normally started.

As described above, in the present exemplary embodiment of the invention, the presence or absence of abnormality in the laser gas can be determined by comparing the actual laser outputs L1 and L2, respectively, at the time when the same laser output command is output at the first laser gas pressure and the second laser gas pressure with the reference outputs R1 and R2, respectively. Accordingly, a change in the composition ratio of the laser gas due to the penetration of the helium gas can be detected without stopping the carbon dioxide gas laser oscillator 10 and without using a laser gas component analyzer. Thus, the change in the composition ratio of the laser gas can be detected in a short time.

In addition, when the laser output is insufficient and does not reach an appropriate value, the cause can be determined as described above. As a result, malfunction that can occur due to abnormality of the composition ratio of the laser gas can be restored in a short time. Furthermore, when laser output is low, an optimum method for starting the carbon dioxide gas laser oscillator 10 can be selected, whereby the carbon dioxide gas laser oscillator 10 can be started in a shortest time.

ADVANTAGEOUS EFFECTS OF THE INVENTION

In the first aspect of the invention, the presence or absence of abnormality in the composition ratio of the laser gas can be determined by comparing the actual laser outputs at the time when the same laser output command is output at the two different laser gas pressures with the reference outputs. Accordingly, a change in the composition ratio of the laser gas due to the penetration of the helium gas can be detected without stopping the gas laser oscillator and without using a laser gas component analyzer. Thus, the change in the composition ratio of the laser gas can be detected in a short time.

In the second aspect of the invention, normality of the composition ratio of the laser gas can be detected in a short time without any need for component analysis of the laser gas and confirmation of laser output characteristics.

In the third aspect of the invention, abnormality of the composition ratio of the laser gas can be detected in a short time without any need for confirmation of leakage of the helium gas and confirmation of laser output characteristics. Accordingly, the consumption of the laser gas necessary to confirm the leakage of the helium gas and confirm the laser output characteristics can be reduced.

In the fourth aspect of the invention, when the composition ratio of the laser gas is abnormal, the laser gas remaining in the vacuum gas container of the carbon dioxide gas laser oscillator and the inside of the laser gas supplying unit is automatically replaced. Thus, the carbon dioxide gas laser oscillator can be restarted in a short time without making the operator carry out complicated work, and it is not necessary to stop the carbon dioxide gas laser oscillator.

In the fifth aspect of the invention, when the composition ratio of the laser gas is determined to be abnormal after restarting of the laser oscillator, the degree of abnormality in the composition ratio of the laser gas can be extremely large. Even in such a case, the carbon dioxide gas laser oscillator can be automatically restarted again in a short time, thus allowing improvement in operation rates of the carbon dioxide gas laser oscillator and the laser processing machine.

In the sixth aspect of the invention, when the composition ratio of the laser gas is determined to be abnormal after restarting of the laser oscillator, the degree of abnormality in the composition ratio of the laser gas can be extremely large, and additionally, the carbon dioxide gas laser oscillator may have been stopped for a long time. Even in such a case, the carbon dioxide gas laser oscillator can be automatically restarted again, thus allowing improvement in the operation rates of the carbon dioxide gas laser oscillator and the laser processing machine. In addition, aging serves to clean the inside of the laser gas piping system.

In the seventh aspect of the invention, the reduction of laser output can be rapidly detected without confirming laser output characteristics.

In the eighth aspect of the invention, even when laser output is low, the carbon dioxide gas laser oscillator can be started in a short time, thus allowing improvement in the operation rate of the laser processing machine.

In the ninth aspect of the invention, even when laser output is extremely reduced due to a long-term operation stop or the like, the carbon dioxide gas laser oscillator can be started in a short time, thus allowing improvement in the operation rate of the laser processing machine.

In the tenth aspect of the invention, it can be determined that the optical system of the carbon dioxide gas laser oscillator is deteriorated or optical axis adjustment is insufficient, as a result of which a warning is output to draw the attention of the operator. Thereby, breakage of the carbon dioxide gas laser oscillator due to the repeated starting thereof can be prevented, and thus restoration can be accelerated.

While the present invention has been described using the typical exemplary embodiments, those skilled in the art could understand that the aforementioned changes and other various changes, deletions, and additions can be made without departing from the scope of the invention.

The invention claimed is:

1. A gas laser apparatus comprising:
a gas laser oscillator comprising a gas container that contains a laser gas as a laser oscillating medium and a pressure acquiring unit that acquires a pressure value of the laser gas in the gas container;
a laser gas source of the laser gas to be contained in the gas container;
a laser gas supplying unit that supplies the laser gas of the laser gas source to the gas container;
a laser gas releasing unit that releases the laser gas from the gas container;
a laser gas pressure controlling unit that controls the laser gas supplying unit and the laser gas releasing unit on a basis of the pressure value acquired by the pressure acquiring unit;
a laser gas pressure command outputting unit that, when the gas laser oscillator is started, outputs a first laser gas pressure command which generates a rated laser output and a second laser gas pressure command smaller than the first laser gas pressure command;
an actual laser output acquiring unit that acquires a first actual laser output at a predetermined laser output command after passage of a predetermined time from issuing of the first laser gas pressure command and acquires a second actual laser output at the predetermined laser output command after passage of the predetermined time from issuing of the second laser gas pressure command; and
a determining unit that determines whether a composition ratio of the laser gas in the gas container is normal or not by comparing the first actual laser output with a first reference output and comparing the second actual laser output with a second reference output smaller than the first reference output.

2. The gas laser apparatus according to claim 1, wherein when the first actual laser output is equal to or more than the first reference output, the determining unit determines that the composition ratio of the laser gas is normal.

3. The gas laser apparatus according to claim 1, wherein when the first actual laser output is smaller than the first reference output and the second actual laser output is equal to or more than the second reference output, the determining unit determines that the composition ratio of the laser gas is abnormal.

4. The gas laser apparatus according to claim 3, wherein when the determining unit determines that the composition ratio of the laser gas is abnormal, the gas laser oscillator is restarted after the laser gas releasing unit and the laser gas supplying unit perform replacement of the laser gas in the gas container.

5. The gas laser apparatus according to claim 4, wherein when, after restarting of the gas laser oscillator, the determining unit determines that the composition ratio of the laser gas is abnormal, the gas laser oscillator is restarted again after performing an aging operation.

6. The gas laser apparatus according to claim 4, wherein when, after restarting of the gas laser oscillator, the determining unit determines that the composition ratio of the laser gas is abnormal, the gas laser oscillator is restarted again after performing an aging operation and the replacement of the laser gas in the gas container by the laser gas releasing unit and the laser gas supplying unit at least one time.

7. The gas laser apparatus according to claim 1, wherein when the first actual laser output is smaller than the first reference output and the second actual laser output is smaller than the second reference output, the determining unit determines that an output of the gas laser oscillator is low.

8. The gas laser apparatus according to claim 7, wherein when the determining unit determines that the output of the gas laser oscillator is low, the gas laser oscillator is restarted after performing an aging operation.

9. The gas laser apparatus according to claim 7, wherein when the determining unit determines that the output of the gas laser oscillator is low, the gas laser oscillator is restarted after performing an aging operation and replacement of the laser gas in the gas container by the laser gas releasing unit and the laser gas supplying unit at least one time.

10. The gas laser apparatus according to claim 9, further comprising a warning outputting unit that outputs a warning when, after restarting of the gas laser oscillator, the determining unit determines that the output of the gas laser oscillator is low.

* * * * *